United States Patent
Walfish et al.

[19]

[11] Patent Number: 6,047,300
[45] Date of Patent: Apr. 4, 2000

[54] SYSTEM AND METHOD FOR AUTOMATICALLY CORRECTING A MISSPELLED WORD

[75] Inventors: Michael Walfish, Scarsdale, N.Y.; Dean Hachamovitch, Bellevue; Ronald Andrew Fein, Seattle, both of Wash.

[73] Assignee: Microsoft Corporation, Redmond, Wash.

[21] Appl. No.: 08/856,913

[22] Filed: May 15, 1997

[51] Int. Cl.[7] .................................. G06F 7/02; G06F 7/04
[52] U.S. Cl. ........................ 707/533; 707/540; 707/531
[58] Field of Search .................................. 707/533, 531, 707/540

[56] References Cited

U.S. PATENT DOCUMENTS

| | | |
|---|---|---|
| 3,969,698 | 7/1976 | Bollinger et al. . |
| 4,010,445 | 3/1977 | Hoshino . |
| 4,136,395 | 1/1979 | Kolpek et al. . |
| 4,355,371 | 10/1982 | Convis et al. ........................... 364/900 |
| 4,498,148 | 2/1985 | Glickman . |
| 4,580,241 | 4/1986 | Kucera ................................... 707/533 |
| 4,650,349 | 3/1987 | Westreich . |
| 4,689,768 | 8/1987 | Heard et al. . |
| 4,730,269 | 3/1988 | Kucera ................................... 707/533 |
| 4,783,758 | 11/1988 | Kucera ................................... 707/533 |
| 4,787,059 | 11/1988 | Yoshimura . |
| 4,797,855 | 1/1989 | Duncan, IV et al. . |
| 4,818,131 | 4/1989 | Sakai . |
| 4,847,766 | 7/1989 | McRae et al. . |
| 4,859,091 | 8/1989 | Ueda . |
| 4,903,206 | 2/1990 | Itoh et al. . |
| 5,189,610 | 2/1993 | Kaplan et al. . |
| 5,218,536 | 6/1993 | McWherter . |
| 5,258,909 | 11/1993 | Damerau et al. . |
| 5,380,105 | 1/1995 | Shimada et al. . |
| 5,572,423 | 11/1996 | Church ....................................... 395/95 |
| 5,761,689 | 6/1998 | Rayson et al. ........................... 707/533 |
| 5,765,180 | 6/1998 | Travis ....................................... 707/533 |

OTHER PUBLICATIONS

Alan Simpson, Mastering WordPerfect 5.1 & 5.2 for Windows, pp. 362, 363, 1993.

*Primary Examiner*—Joseph H. Feild
*Assistant Examiner*—Cong-Lac Huynh
*Attorney, Agent, or Firm*—Jones & Askew, LLP

[57] ABSTRACT

Automatically detecting a misspelled word and replacing the misspelled word with a correctly spelled word. Words are automatically spell checked as delimited. If a word is detected as a misspelled word then a correctly spelled alternate word is generated. The misspelled word and the correctly spelled alternate word are compared according to a set of difference criteria. The difference criteria correspond to common types of misspellings. If the misspelled word and the correctly spelled alternate word differ according to a difference criterion then the correctly spelled alternate word is identified as a replacement candidate word. The results of the difference criteria comparisons are reviewed using a set of selection criteria. If the results of the difference criteria comparisons satisfy the selection criteria then one of the replacement candidate words is correctly spelled as a replacement word and the misspelled word is replaced by the replacement word.

34 Claims, 8 Drawing Sheets

SYSTEM AND METHOD FOR AUTOMATICALLY CORRECTING A MISSPELLED WORD

FIELD OF THE INVENTION

This invention relates in general to replacing an invalid string with a valid string and, more particularly to a system and method for automatically detecting a misspelled word and replacing the misspelled word with a correctly spelled word.

BACKGROUND OF THE INVENTION

Word processing programs help users create error free documents by providing editing and proofing tools to detect and correct errors. For example, word processing programs typically include a spell checker to detect and correct spelling errors. Prior art spell checkers include post-processing spell checkers, background spell checkers and automatic spell checkers.

A post-processing spell checker is manually invoked by a user after all or part of a document is typed. A post-processing spell checker uses a spelling dictionary containing a number of correctly spelled words. To detect a spelling error, each word in the document is compared with the correctly spelled words in the spelling dictionary. If a word in the document does not match any of the correctly spelled words in the spelling dictionary, then it is identified as a misspelled word. Generally, once the spell checker detects a misspelled word, it provides the user with a list of correctly spelled alternate words. The user may correct the misspelled word by selecting one of the correctly spelled alternate words to replace the misspelled word. The misspelled word may be displayed to the user along with a list of correctly spelled alternate words from the spelling dictionary via a spelling correction user interface, such as a dialogue box. The spelling correction user interface may include a number of options, such as "replace," "replace all," "ignore," "ignore all," "delete," and "add to spelling dictionary." If the user selects one of the correctly spelled alternate words and the "replace" or "replace all" option, then the post-processing spell checker corrects the misspelled word by replacing it with the correctly spelled alternate word.

A background spell checker, such as the "SPELL-IT" spell checker program module included in the "WORD FOR WINDOWS 95" word processing program marketed by Microsoft Corporation of Redmond, Washington, automatically detects a misspelled word. The misspelled word is detected as soon as the user enters the misspelled word, but the misspelled word is not automatically corrected. To correct the misspelled word, the user must manually correct the misspelled word or invoke a post-processing spell checker.

An automatic spell checker, such as the "AUTOCORRECT" program module ("AutoCorrect") included in the "WORD 6" word processing program marketed by Microsoft Corporation of Redmond, Washington, automatically detects and corrects a misspelled word. AutoCorrect uses a list containing corrected word pairs (the "AutoCorrect List"). A corrected word pair includes a commonly misspelled word and a corresponding correctly spelled word. AutoCorrect compares each word in the document with the misspelled words in the AutoCorrect List as the word is entered by the user. If a word in the document matches a misspelled word in the AutoCorrect List, then the word is replaced with the corresponding correctly spelled word from the corrected word pair without any user interaction.

A disadvantage of an automatic spell checker such as AutoCorrect is that it only corrects misspelled words contained in the AutoCorrect List. If a misspelled word is not in the AutoCorrect List, then the user must manually correct the misspelled word or must manually invoke a post-processing spell checker to correct the misspelled word. The corrected word pairs contained in the AutoCorrect List are predetermined and are generally static. The number of corrected word pairs contained in the AutoCorrect List is limited because the AutoCorrect List remains resident in the computer's memory. Limiting the size of the list limits the amount of memory consumed but also limits the number of misspelled words which can be corrected.

If an automatic spell checker could more closely imitate the interaction between the user and a post-processing spell checker, the number of misspelled words automatically corrected could be increased dramatically. However, a spelling dictionary does not generally contain the one to one relationship between a misspelled word and a correctly spelled word required by current automatic spell checkers. An improved automatic spell checker is needed to automatically detect a misspelled word and to automatically replace the misspelled word with a correctly spelled word selected from a list of correctly spelled words.

A user may repeatedly misspell a particular word. The misspelling may be due to a typographical error or a cognitive spelling error. If an automatic spell checker detects the misspelled word and identifies a correctly spelled word selected from a list of correctly spelled words, then the misspelled word and the correctly spelled word may define a corrected word pair. If the misspelled word and the correctly spelled word could be automatically added to the AutoCorrect List, then subsequent occurrences of the misspelled word may be corrected by AutoCorrect. An improved automatic spell checker is needed to automatically add the misspelled word and the correctly spelled word as a corrected word pair to the AutoCorrect List.

Accordingly, there is a need in the art for detecting a misspelled word and automatically correcting the misspelled word by selecting a correctly spelled word from a list of correctly spelled words. There is also a need in the art for automatically adding a misspelled word and a correctly spelled word as a corrected word pair to the AutoCorrect List.

SUMMARY OF THE INVENTION

The present invention meets the needs described above by providing a method for automatically detecting a first string which does not match a predetermined string and replacing the first string with a second string which matches a predetermined string. The first string and the second string may be data strings, alphanumeric strings, words or sequences of strings or words. A predetermined string may be valid or correct string for a given implementation. If a predetermined string is a valid string, then the present invention may be used to automatically detect an invalid string and to replace the invalid string with a valid string. An invalid string may be defined as a string which does not match a valid string. For example, if the first string and the second string are words and a predetermined string is a correctly spelled word, then the present invention may be used to automatically detect a misspelled word and to replace the misspelled word with a correctly spelled word.

A spelling embodiment of the present invention checks each word as it is entered by a user and determines whether the word is correctly spelled. Once a misspelled word is identified, a list of correctly spelled alternate words corresponding to the misspelled word is generated. The misspelled word may be compared to a set of replacement criteria. Unless the misspelled word satisfies the replacement criteria, the misspelled word is not replaced. In the spelling embodiment, the replacement criteria typically include requiring a minimum number of letters in the misspelled word and requiring that the misspelled word begin with a lower case letter. If the replacement criteria is met, then the misspelled word and each of the correctly spelled alternate words are compared using a set of difference criteria. The difference criteria are designed to detect common spelling errors. The errors may be typographical errors or cognitive spelling errors. An example of a difference criterion based on a typographical error is the "Exactly One Adjacent Transpose" difference criterion. The Exactly One Adjacent Transpose difference criterion determines whether transposing two adjacent characters in the misspelled word produces the correctly spelled alternate word.

If the misspelled word and a correctly spelled alternate word differ according to a difference criterion, the correctly spelled alternate word is identified as a replacement candidate word. A replacement indicator is set for each difference criterion to indicate whether the difference criterion identified zero, one, or more than one replacement candidate words. The replacement indicators and the replacement candidate words are compared using selection criteria. If the replacement indicators and the replacement candidate words satisfy the selection criteria, then a replacement candidate word is selected as the replacement word. For example, the selection criteria may require that only one of the difference criteria identify only one replacement candidate word. Once the replacement word is selected, the misspelled word is automatically replaced by the replacement word.

The spelling embodiment may include the AutoCorrect functions, including the AutoCorrect List. The AutoCorrect List contains corrected word pairs and is used to correct a misspelled word. A corrected word pair includes a misspelled word and a corresponding correctly spelled word. The spelling embodiment automatically adds a corrected word pair including the misspelled word and the correctly spelled replacement word to the AutoCorrect List whenever a misspelled word is automatically replaced by the replacement word. By adding the misspelled word and the correctly spelled replacement word to the AutoCorrect List, subsequent occurrences of the misspelled word may be corrected using the AutoCorrect List rather than repeating the comparison steps of the spelling embodiment.

Even though a word is detected as a misspelled word, the user may have intended that the word appear as entered. To maintain the word as entered, the automatic replacement of the "misspelled" word must be overridden. To override the replacement, the spelling embodiment may include an Exceptions List of exception words. An exception word is a word which is defined by the user and which is not subject to replacement. The user may edit the Exceptions List to add exception words. In addition, exception words are automatically added to the Exceptions List whenever the user rejects a replacement word generated by the replacement test in favor of the original word. If the user rejects a replacement word in favor of the original word then the original word is placed in the Exceptions List so that subsequent occurrences of the word are unchanged by the replacement test.

These and other aspects, features and advantages of the present invention may be more clearly understood and appreciated from a review of the following detailed description of the disclosed embodiments and by reference to the appended drawings and claims.

DETAILED DESCRIPTION

The present invention is directed toward a system and method for automatically detecting a first string which does not match a predetermined string and replacing the first string with a second string which matches a predetermined string. The second string may be selected from a list of predetermined strings. The list of predetermined strings may include valid or correct strings for a given implementation. If the list of predetermined strings includes valid strings, then the present invention may be used to automatically detect an invalid string and to replace the invalid string with a valid string. An invalid string is a string which does not match a valid string.

In one embodiment, the invention may be used to detect a misspelled word and to replace the misspelled word with a correctly spelled word and may be incorporated into an editing program, such as the word processing program entitled "WORD", marketed by Microsoft Corporation of Redmond, Washington. Briefly described, a spelling embodiment of the present invention detects a misspelled word and generates one or more correctly spelled alternate words. The misspelled word and the correctly spelled alternate words are compared using a set of rules or difference criteria. The results of the comparisons between the misspelled word and the correctly spelled alternate words are compared to a set of selection criteria. If the results satisfy the selection criteria, then one of the correctly spelled alternate words is selected as a replacement word. The misspelled word is then replaced by the replacement word.

Exemplary Operating Environment

Figure 1:
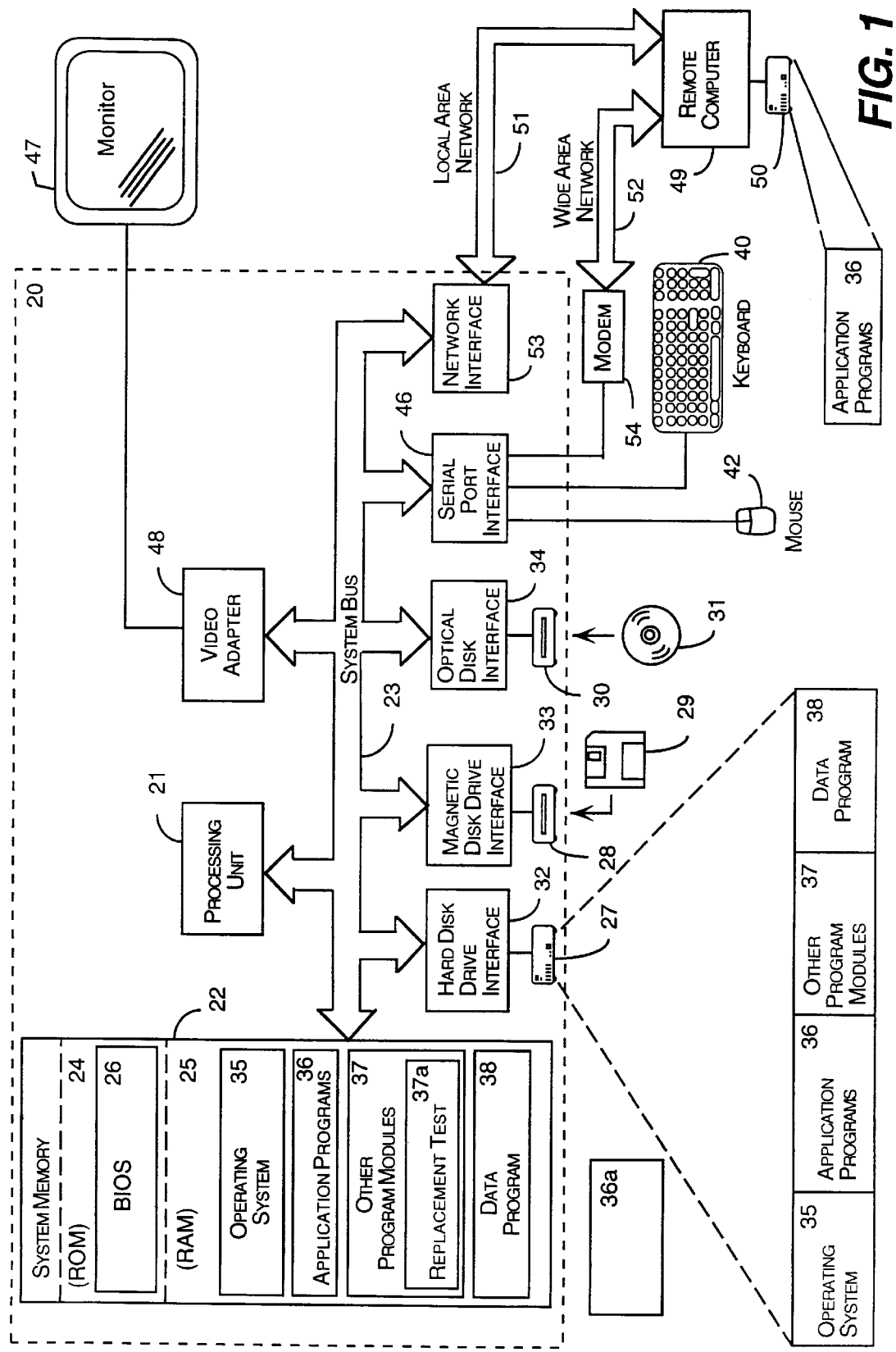
FIG. 1 is a block diagram of a personal computer illustrating the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, such as the replacement test described below, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

SPELLING EMBODIMENT

Detecting and Correcting a Misspelled Word

The present invention may be used to automatically detect an invalid string and to replace the invalid string with a valid string. One embodiment of the present invention may be used to automatically detect a misspelled word and to replace the misspelled word with a correctly spelled word. Other embodiments of the present invention may be used to detect and correct errors in other types of strings, such as data strings, alphanumeric strings or sequences of strings or words.

In the spelling embodiment, the present invention may be implemented in connection with an editing program which automatically detects and corrects a misspelled word using a list of corrected word pairs (the "AutoCorrect List"). AutoCorrect is described in the commonly assigned U.S. patent application Ser. No. 08/482,194, entitled "Method and System for Interactive Formatting of Word Processing Documents", filed Jun. 7, 1995, inventor Dale Gipson, which is incorporated by reference. A corrected word pair includes a commonly misspelled word and a corresponding correctly spelled word. After a user delimits a word by entering a punctuation mark or a white space character, such as a space, indicating the end of a word, the word is compared to the misspelled words in the AutoCorrect List. If a word in the document matches a misspelled word in the AutoCorrect List, then the word is replaced with the corresponding correctly spelled word from the corrected word pair without any user interaction. The spelling embodiment may use AutoCorrect to automatically detect and correct a misspelled word using a list of corrected word pairs. Alternatively, the spelling embodiment may incorporate the functions of automatically detecting and correcting a misspelled word using a list of corrected word pairs.

AutoCorrect only corrects misspelled words contained in the AutoCorrect List. The spelling embodiment corrects misspelled words which are not corrected by AutoCorrect. If a word is detected as a misspelled word, but is not corrected by AutoCorrect, then the spelling embodiment may be used to identify a correctly spelled replacement word for the misspelled word. After the word is identified as a misspelled word, typically one or more correctly spelled alternate words are generated. The correctly spelled alternate words are used to perform a replacement test to determine whether the misspelled word should be replaced by one of the correctly spelled alternate words. The spelling embodiment may use a prior art spell checker to detect a misspelled word and to generate correctly spelled alternate words. Alternatively, the spelling embodiment may incorporate the functions of detecting a misspelled word and generating correctly spelled alternate words.

Performing the replacement test includes three stages. In the first stage of the replacement test, the misspelled word may be compared to a set of predetermined replacement criteria to determine whether the misspelled word is a candidate for replacement. In the spelling embodiment, the replacement criteria may require that the misspelled word begin with a lower case letter or have a certain number of letters. The replacement criteria may also require that no more than a maximum number of correctly spelled alternate words were identified. The replacement criteria are predetermined and are designed to minimize the number of erroneous corrections. The replacement criteria may vary from implementation to implementation. For example, the replacement criteria for an English language embodiment may be different than the replacement criteria for a French language embodiment. If the misspelled word does not satisfy the replacement criteria, then the misspelled word is not replaced.

The first stage may also select a subset of the correctly spelled alternate words as selected alternate words. The selection may be based upon the correction probabilities associated with the correctly spelled alternate words. A correction probability is the probability that a correctly spelled alternate word is the correct word. Typically, a correction probability is generated for each correctly spelled alternate word. In one embodiment, a correctly spelled alternate word may be selected as a selected alternate word, if the correction probability for the correctly spelled alternate word meets a predetermined probability threshold. In another embodiment, a correctly spelled alternate word may be selected as a selected alternate word if the correction probability for the correctly spelled alternate word indicates that the word is one of the most probable alternates, e.g. the word has one of the highest correction probabilities. The use of a correction probability is optional. If the correction probability is not used, then all of the correctly spelled alternate words are selected as selected alternate words.

In the second stage, the misspelled word is compared to a selected alternate word using a set of difference criteria. In the spelling embodiment, the difference criteria are designed to detect common user errors such as typing errors or cognitive spelling errors. The second stage is repeated for each selected alternate word identified. In the spelling embodiment, the difference criteria may include criteria based upon character transposition, character insertion, character deletion and capitalization. If the misspelled word and a selected alternate word differ according to a difference criterion, then the selected alternate word is selected as a replacement candidate word.

An exemplary difference criterion based upon character transposition may be described as "Exactly One Adjacent Transpose." A misspelled word and a selected alternate word satisfy the Exactly One Adjacent Transpose difference criterion if the misspelled word and the selected alternate word differ by exactly one adjacent character transposition. For example, if the misspelled word is "fastdiious" and the selected alternate word is "fastidious", then the misspelled word and the selected alternate word differ by only one adjacent character transposition.

Another exemplary difference criterion based upon capitalization may be described as "Initial Capital." A misspelled word and a selected alternate word satisfy the Initial Capital difference criterion if the misspelled word and the selected alternate word differ by only the capitalization of the first character of the word. For example, if the misspelled word is "english" and the selected alternate word is "English", then the misspelled word and the selected alternate word differ by only the capitalization of the first character of the word.

Another exemplary difference criterion based upon capitalization may be referred to as "All Capitals." A misspelled word and a selected alternate word satisfy the All Capitals difference criterion if the misspelled word and the selected alternate word differ by only the capitalization of the characters of the word. For example, if the misspelled word is "nafta" and the selected alternate word is "NAFTA", then the misspelled word and the selected alternate word satisfy the All Capitals difference criterion because the two words differ by only the capitalization of the characters of the word.

An exemplary difference criterion based upon the insertion or deletion of a character may be described as "Off by One Double Character." A misspelled word and a selected alternate word satisfy the Off by One Double Character difference criterion if the misspelled word and the selected alternate word differ by only a double character. Either the misspelled word contains a double character which should be a single character or the misspelled word contains a single character which should be a double character. For example, if the misspelled word is "afternon" and the selected alternate word is "afternoon", then the misspelled word and the selected alternate word differ by only a missing double character.

Another exemplary difference criterion based upon the insertion or deletion of a character may be described as "Off by One Insertion or Deletion." A misspelled word and a selected alternate word satisfy the Off by One Insertion or Deletion difference criterion if the misspelled word and the selected alternate word differ by the insertion or deletion of a single character. For example, if the misspelled word is "committment" and the selected alternate word is "commitment", then the misspelled word and the selected alternate word satisfy the Off by One Insertion or Deletion difference criteria because deleting a "t" from "committment" produces "commitment".

An exemplary difference criterion based upon a diacritic may be described as "Off by One Diacritic." A misspelled word and a selected alternate word satisfy this difference criterion if the misspelled word and the selected alternate word differ by the insertion or deletion of a diacritic or accent. For example, if the misspelled word is "tête-a-tête" and the selected alternate word is "tête-a-tête", then the misspelled word and the selected alternate word differ by the insertion or deletion of a diacritic.

Additional difference criteria may be based upon common typing errors that occur due to the arrangement of the keys of a keyboard. An exemplary difference criterion based upon the arrangement of the keys of a keyboard may be described as "Off by Adjacent Key." A misspelled word and a selected alternate word satisfy the Off by Adjacent Key difference criterion if replacing a first character in the misspelled word with a second character produces the selected alternate word and the first character and the second character are entered using adjacent keys on a keyboard. For a QWERTY keyboard, if the misspelled word is "researcj" and the selected alternate word is "research", then the misspelled word and the selected alternate word satisfy the Off by Adjacent Key difference criterion.

Another exemplary difference criterion based upon the arrangement of the keys of a keyboard may be described as "Off by Control Key." A misspelled word and a selected alternate word satisfy the Off by Control Key difference criterion if a first character is entered using a combination of a control key and a first key and a second character is entered using only the first key, and replacing the first character in the misspelled word with the second character produces the selected alternate word. For a QWERTY keyboard, if the misspelled word is "shouldn't" and the selected alternate word is "shouldn't", then the misspelled word and the selected alternate word satisfy the Off by Control Key difference criterion.

A third exemplary difference criterion based upon the arrangement of the keys of a keyboard may be described as "Off by Deletion of Adjacent Key." A misspelled word and a selected alternate word satisfy the Off by Deletion of Adjacent Key difference criterion if the misspelled word includes a first character and a second character, the first character and the second character are adjacent to one another in the misspelled word and on the keyboard, and deleting the second character from the misspelled word produces the selected alternate word. For a QWERTY keyboard, if the misspelled word is "bvright" and the selected alternate word is "bright", then the misspelled word and the selected alternate word satisfy the Off by Deletion of Adjacent Key difference criterion.

Other difference criteria may be based upon common cognitive spelling errors that occur due to English being a second language. The difference criteria may also differ according to language. For example, the difference criteria for an English language embodiment may be different than the difference criteria for a French language embodiment. The selection of the difference criteria for a given implementation is predetermined. The difference criteria are selected to maximize the number of misspelled words corrected and to minimize the number of erroneous corrections. An erroneous correction occurs if a misspelled word is replaced by a selected word, but the user intended to enter a different selected word or the original misspelled word.

In the third stage of the replacement test, predetermined selection criteria are applied to the replacement indicators and the replacement candidate words identified in the second stage of the replacement test. If the replacement indicators and the replacement candidate words satisfy the selection criteria, then one of the replacement candidate words is selected as a replacement word. The selection criteria are designed to maximize the number of misspelled words corrected and to minimize the number of erroneous corrections.

If the replacement indicators and the replacement candidate words do not satisfy the selection criteria, no replacement word is selected. As an example, the selection criteria may require that exactly one of the difference criteria identify exactly one replacement candidate word. If exactly one of the difference criteria identifies exactly one replacement candidate word, then the replacement candidate word is selected as a replacement word and the misspelled word is replaced by the replacement word. If no replacement words are identified by the difference criteria or multiple replacement words are identified by the difference criteria, then the selection criteria is not satisfied and the misspelled word is not replaced. For example, if the user enters the word "reaminder", the Exactly One Adjacent Transpose difference criterion identifies "remainder" as a replacement candidate word and the Off By One Insertion or Deletion difference criteria identifies "reminder" as a replacement candidate word. If the selection criteria requires that exactly one of the difference criteria identify exactly one replacement candidate word, then the word "reaminder" is not replaced because two replacement candidate words were identified.

Figure 2:
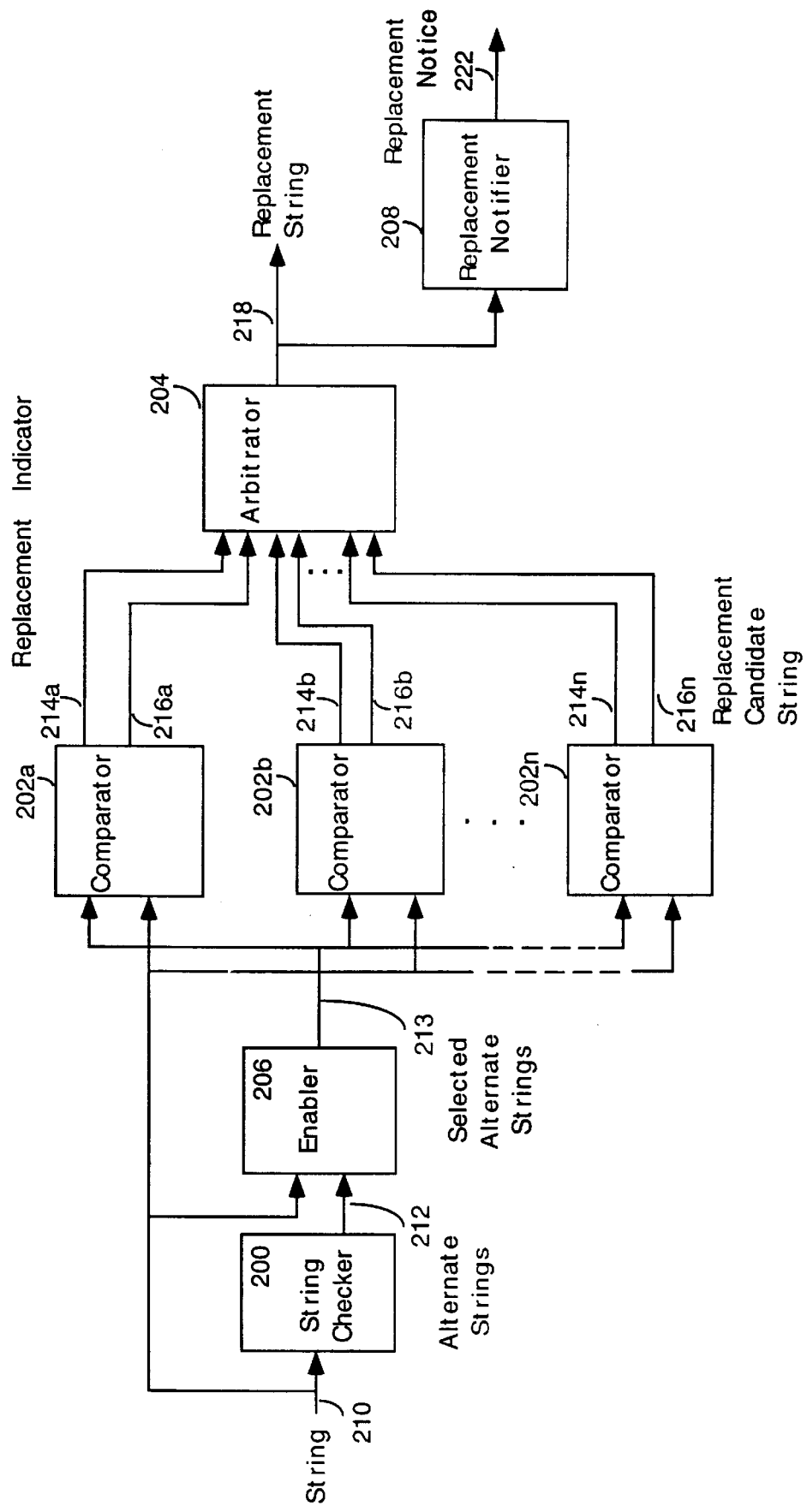
FIG. 2 is a block diagram illustrating a string checker, an enabler, a set of comparators, an arbitrator and a replacement notifier in accordance with an exemplary embodiment of the present invention.

FIG. 2 illustrates the program modules which may be used in the spelling embodiment to detect a misspelled word and to replace the misspelled word with a correctly spelled word. In the spelling embodiment, the "strings" of FIG. 2 are words. A word 210 is input into the string checker program module 200. The string checker program module 200 includes the functions of detecting a misspelled word and generating correctly spelled alternate words 212. The correctly spelled alternate words 212 generated by the string checker program module are input into the enabler program module 206. In addition to the correctly spelled alternate words, the word is also input into the enabler program module.

The enabler program module 206 applies the replacement criteria to the word 210 and to the correctly spelled alternate words 212 to determine whether the replacement criteria are satisfied. If the replacement criteria are satisfied, then the enabler program module 206 outputs the selected alternate words 213 to the comparator program modules 202a, 202b, . . . 202n. If the replacement criteria are not satisfied, then the misspelled word is not replaced. The enabler program module also selects the selected alternate words 213 from the correctly spelled alternate words 212 generated by the string checker 200. In one embodiment, all the correctly spelled alternate words 212 are selected as selected alternate words 213. In another embodiment, only the most probable correctly spelled alternate words are selected as selected alternate words, e.g. the three most probable words. The three most probable correctly spelled alternate words are defined as the three correctly spelled alternate words with the three highest correction probabilities. Other embodiments may use different criteria to select the selected alternate words 213. The selected alternate words 213 output from the enabler program module 206 are input into the comparator program modules 202a, 202b . . . 202n.

Each comparator program module corresponds to a difference criterion. For example, comparator program module 202a may correspond to the Exactly One Adjacent Transpose difference criterion, comparator program module 202b may correspond to the Initial Cap difference criterion, and comparator program module 202n may correspond to the Off by One Diacritic difference criterion. Each comparator program module 202a, 202b . . . 202n compares the word 210 and the selected alternate words 213 using the difference criterion corresponding to that comparator program module. Each comparator program module 202a, 202b . . . 202n outputs a replacement indicator 214a, 214b . . . 214n indicating the results of the comparisons between the word 210 and the selected alternate words 213. A replacement indicator, for example replacement indicator 214a, indicates that the comparator program module 202a identified zero, one, or more than one replacement candidate words. If the misspelled word and a selected alternate word differ according to the difference criterion, then the comparator program module 202a also outputs a replacement candidate word, such as replacement candidate word 216a.

The replacement indicators 214a, 214b . . . 214n and any replacement candidate words 216a, 216b . . . 216n output from the comparator program modules are input into the arbitrator program module 204. The arbitrator program module applies the selection criteria to the replacement indicators 214*a*, 214*b* . . . 214*n* and any replacement candidate words 216*a*, 216*b* . . . 216*n* to determine whether the replacement indicators 214*a*, 214*b* . . . 214*n* and the replacement candidate words 216*a*, 216*b* . . . 216*n* satisfy the selection criteria. If the replacement indicators 214*a*, 214*b* . . . 214*n* and the replacement candidate words 216*a*, 216*b* . . . 216*n* satisfy the selection criteria, then the arbitrator program module identifies one of the replacement candidate words as a replacement word. The arbitrator 204 replaces the word 210 with the replacement word 218. When the arbitrator 204 replaces the word 210, the replacement notifier program module 208 may provide a replacement notice 222 to the user that the word was replaced by the replacement word.

Figure 3:
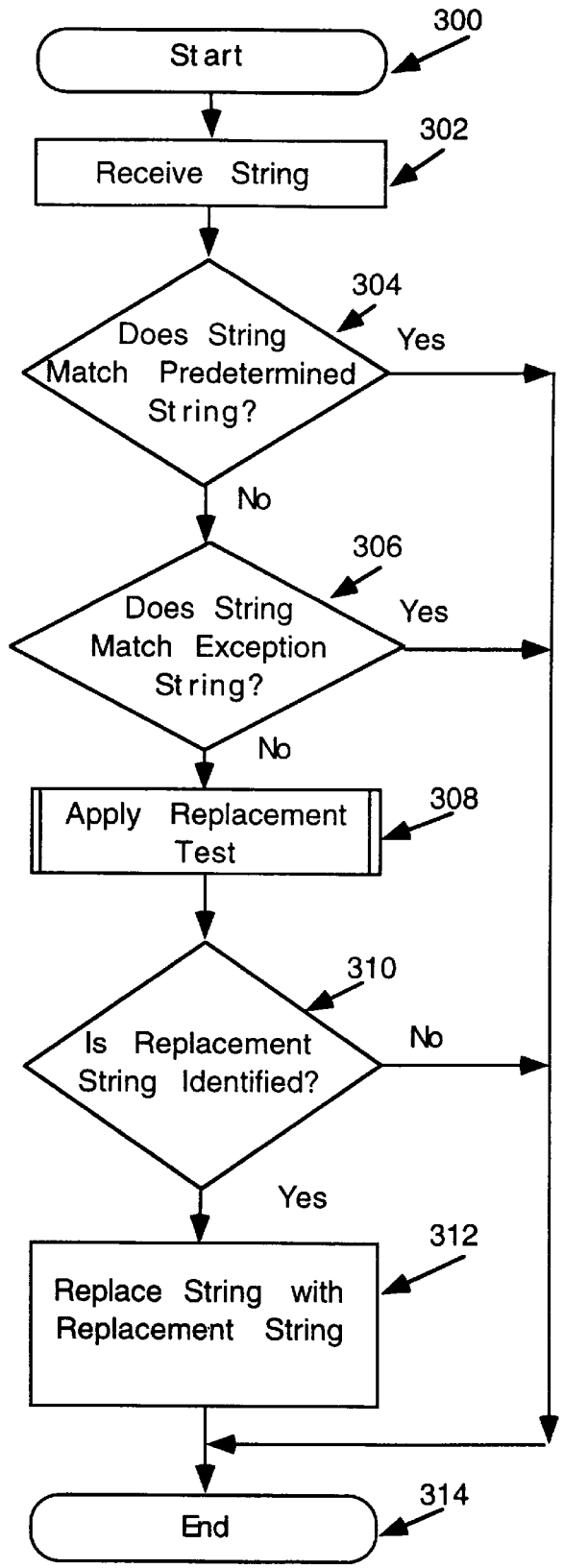
FIG. 3 is a logical flow diagram illustrating the steps for replacing a first string with a second string in accordance with an exemplary embodiment of the present invention.

The method for automatically detecting a misspelled word and replacing the misspelled word with a correctly spelled word may be illustrated by an example using the word "konwledge" and the flow diagrams of FIGS. 3, 4A, 4B and 4C. In the spelling embodiment, the "strings" of FIGS. 3, 4A, 4B and 4C are words. In FIG. 3, the method begins at the START task of step 300 and proceeds to step 302 to receive a word. In this example, the word is "konwledge". In step 304, the word is compared to a spelling dictionary containing a list of correctly spelled words. If the word matches one of the correctly spelled words, then the determination in step 304 is that the word is a correctly spelled word. If the word does not match one of the correctly spelled words, then the determination in step 304 is that the word is misspelled. In this example, the determination in step 304 is that the word "konwledge" is a misspelled word.

Once the word "konwledge" is determined to be a misspelled word, it is compared to the exception words in the Exception List in step 306. Typically, exception words are words defined by the user and are not subject to replacement. Exception words are discussed in more detail below. If the word "konwledge" matches an exception word then the method ends at step 314. If the word does not match an exception word then the replacement test is performed in step 308. In this example, the word "konwledge" does not match an exception word, so the method proceeds to step 308 and the replacement test is performed.

Figure 4A:
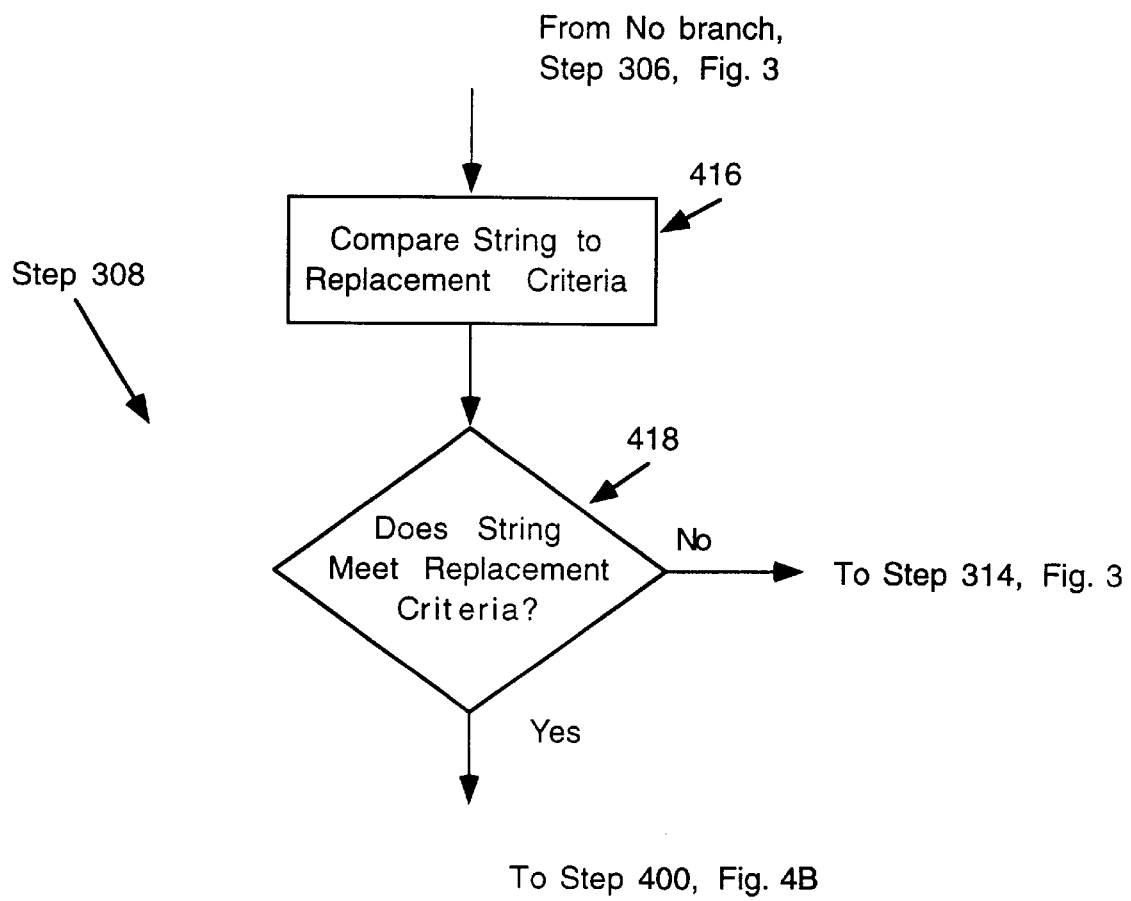
FIG. 4A is a logical flow diagram illustrating the steps for comparing a first string to a set of replacement criteria in accordance with an exemplary embodiment of the present invention.

The first stage of the replacement test is illustrated in FIG. 4A. In the spelling embodiment, the misspelled word is compared to a predetermined set of replacement criteria in step 416. In this example, the replacement criteria include determining whether the misspelled word begins with a lower case letter, determining whether the misspelled word contains at least five characters, and determining whether no more than seven correctly spelled alternate words were identified. In step 418, a determination is made that the word "konwledge" satisfies the replacement criteria because "konwledge" begins with a lower case letter, contains at least five letters, and only one correctly spelled alternate word (knowledge) was identified. The YES branch is followed to step 400 of FIG. 4B. If the misspelled word does not satisfy the replacement criteria, then the NO branch is followed to step 314 of FIG. 3.

Figure 4B:
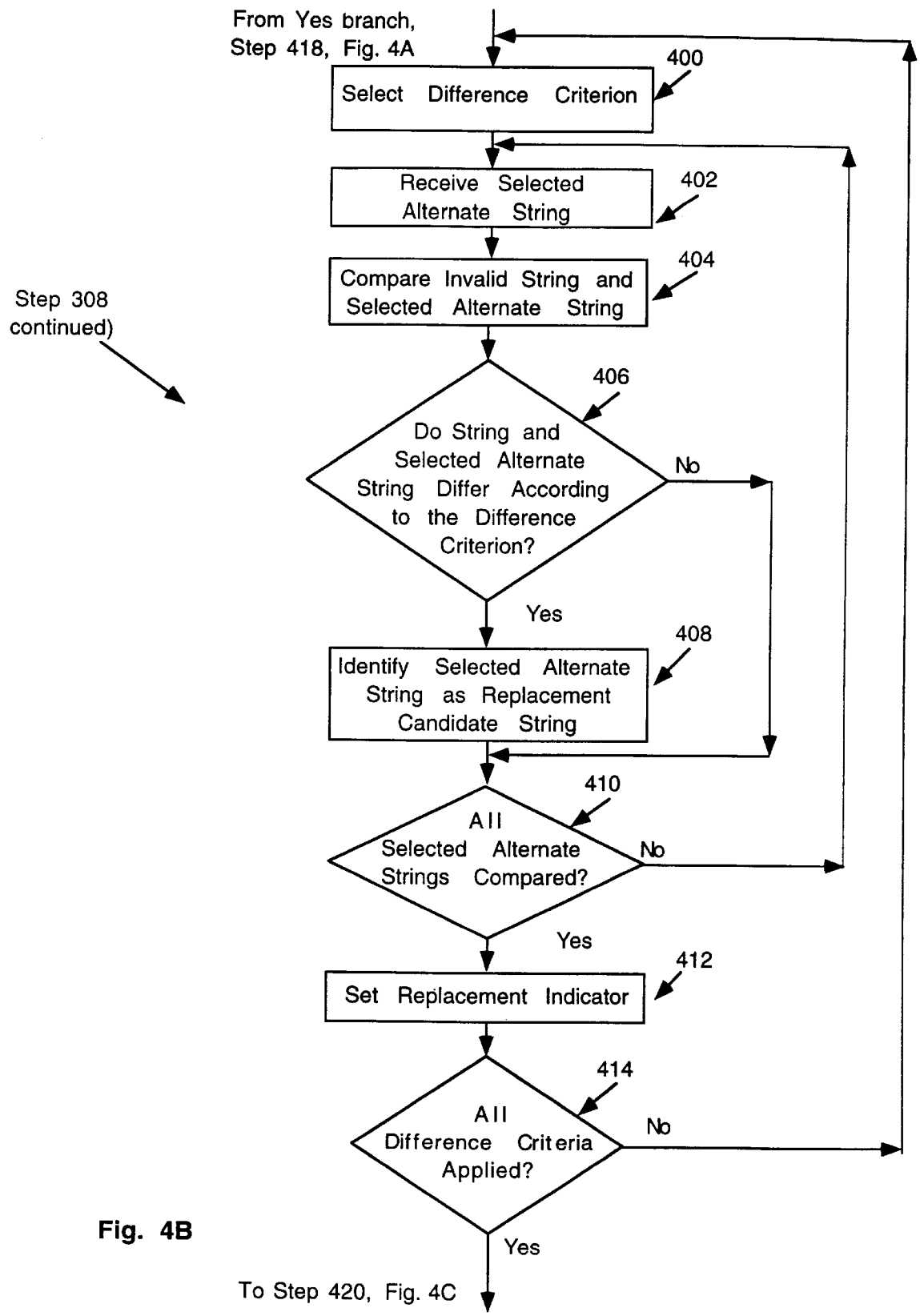
FIG. 4B is a logical flow diagram illustrating the steps for comparing a first string with a second string using a set of difference criteria in accordance with an exemplary embodiment of the present invention.

The second stage of the replacement test is illustrated in FIG. 4B. In step 400, one of the difference criteria is selected. In this example, the difference criteria include the Exactly One Adjacent Transpose difference criterion, the Initial Capital difference criterion and the Off by One Double Character difference criterion. Different implementations may use different difference criteria.

The Exactly One Adjacent Transpose difference criterion is selected in step 400. Once the Exactly One Adjacent Transpose difference criterion is selected, a selected alternate word is received in step 402. In this example, "knowledge" is received as the selected alternate word. The selected alternate word "knowledge" and the misspelled word "konwledge" are compared in step 404 using the Exactly One Adjacent Transpose difference criterion. The determination in step 406 is that the words "konwledge" and "knowledge" satisfy the Exactly One Adjacent Transpose difference criterion because transposing the "o" and the "n" in "konwledge" produces "knowledge" so the method follows the YES branch to step 408. In step 408, the word "knowledge" is identified as a replacement candidate word by the Exactly One Adjacent Transpose difference criterion. If the determination in step 406 is that the words do not satisfy the difference criterion, then the method skips step 408 and continues at step 410. In step 410, a determination is made as to whether the misspelled word and all the selected alternate words have been compared using the difference criterion. In this example, there is only one selected alternate word, so the YES branch is followed to step 412. If there are additional selected alternate words, then the NO branch is followed to step 402 and another selected alternate word is received.

In step 412, a replacement indicator for the Exactly One Adjacent Transpose difference criterion is set to indicate that one replacement candidate word for "konwledge" was identified. After the replacement indicator is set for the Exactly One Adjacent Transpose difference criterion in step 412, a determination is made as to whether all the difference criteria have been applied in step 414. If all the difference criteria have been applied, then the method proceeds to the third stage of the replacement test. If all the difference criteria have not been applied, then the method returns to step 400 and the second stage of the replacement test is repeated using a different difference criterion.

In this example, only one of the three difference criteria has been applied so the determination in step 414 is that all the difference criteria have not been applied. The method returns to step 400 and the Initial Capital difference criterion is selected in step 400. In step 402, the selected alternate word "knowledge" is received. The words "konwledge" and "knowledge" are compared using the Initial Capital difference criterion in step 404. In step 406, a determination is made that the words "konwledge" and "knowledge" do not satisfy the Initial Capital difference criterion because capitalizing the first character of "konwledge" does not produce "knowledge". The method follows the NO branch of step 406 to step 410. In step 410, a determination is made as to whether the misspelled word and all the selected alternate words have been compared. In this example, all the selected alternate words have been compared so the YES branch is followed to step 412. In step 412, the replacement indicator for the Initial Capital difference criterion is set to indicate that zero replacement candidate words for "konwledge" were identified. From step 412, the method proceeds to step 414 where a determination is made as to whether all the difference criteria have been applied. Because the Off by One Double Character difference criterion has not been applied, the method follows the NO branch from step 414 and to step 400.

In step 400, the Off by One Double Character difference criterion is selected. The selected alternate word "knowledge" is received in step 402. The words "konwledge" and "knowledge" are compared using the Off by One Double Character difference criterion in step 402. In step 404, the words "konwledge" and "knowledge" are compared using the Off by One Double Character difference criterion. A determination is made that the words "konwledge" and "knowledge" do not satisfy the Off by One Double Character difference criterion, in step 406, because adding an identical character or deleting a repeated character from "konwledge" does not produce "knowledge". The method follows the NO branch from step 406 to step 410 where a determination is made that all the selected alternate strings have been received. In step 412, the replacement indicator for the Off by One Double Character difference criterion is set to indicate that zero replacement candidate words for "konwledge" were identified. In this iteration, the determination in step 414 is that all of the difference criteria have been applied, so the method proceeds to the third stage of the replacement test.

Although the flow diagram of FIG. 4B indicates that the second stage of the replacement test is sequentially repeated for each difference criterion, other implementations are possible. Alternative implementations include applying the difference criteria in parallel and applying all difference criteria using a selected alternate word before receiving another selected alternate word.

Figure 4C:
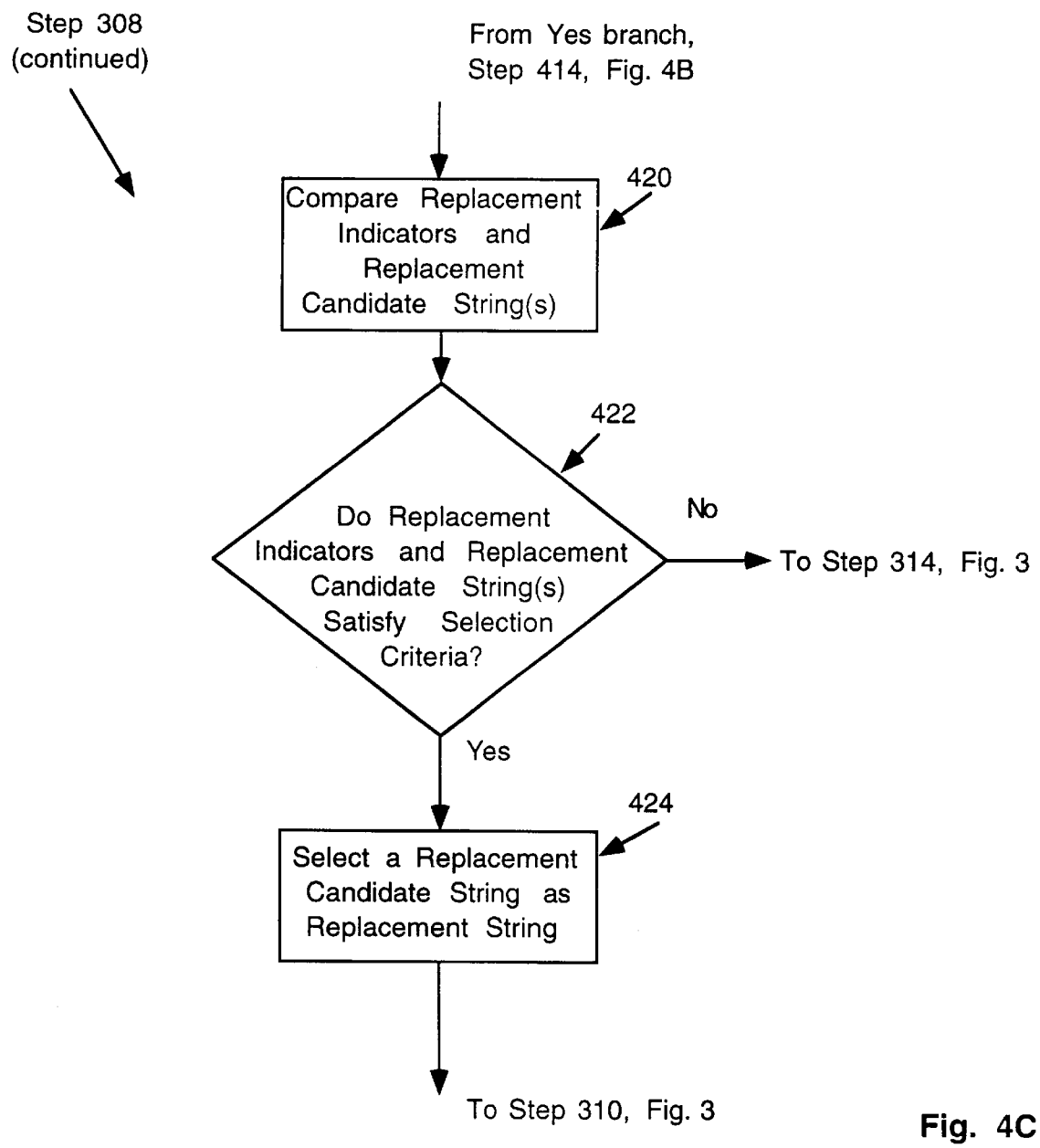
FIG. 4C is a logical flow diagram illustrating the steps for comparing replacement indicators generated by a set of difference criteria using a set of selection criteria in accordance with an exemplary embodiment of the present invention.

The third stage of the replacement test is illustrated in FIG. 4C. The replacement indicators and the replacement candidate words from the second stage of the replacement test are compared to the predetermined selection criteria in step 420. The replacement indicators from the Exactly One Adjacent Transpose difference criterion, the Initial Capital difference criterion and the Off by One Double Character difference criterion and the replacement candidate word "knowledge" are compared in this example. In step 422, a determination is made as to whether the replacement indicators and the replacement candidate word satisfy the selection criteria. In this example, the predetermined selection criteria require that only one replacement candidate word is identified by only one difference criterion. The replacement indicators indicate that one replacement candidate word was identified by the Exactly One Adjacent Transpose difference criterion and zero replacement candidate words were identified by the Initial Capital difference criterion and the Off by One Double Character difference criterion. The replacement indicators satisfy the selection criteria so the replacement candidate word "knowledge" is selected as the replacement word in step 424. If the replacement indicators and the replacement candidate word do not satisfy the selection criteria, then the NO branch from step 422 is followed to step 314 of FIG. 3.

After the replacement candidate word "knowledge" is selected as the replacement word in step 424, the method proceeds to step 310 of FIG. 3. In step 310, a determination is made as to whether the replacement test identified a replacement word. In this example, the replacement test identified a replacement word so the method proceeds to step 312. In step 312, the misspelled word "konwledge" is replaced by the replacement word "knowledge". The method then ends at the END task of step 314.

Adding a Corrected Word Pair to the AutoCorrect List

The spelling embodiment may automatically add corrected word pairs to the AutoCorrect List. As described above, the AutoCorrect List contains corrected word pairs for correcting a misspelled word. Once a misspelled word is replaced with a replacement word, a corrected word pair including the misspelled word and the correctly spelled replacement word is automatically added to the AutoCorrect List By adding the misspelled word and the replacement word to the AutoCorrect List, subsequent occurrences of the misspelled word may be efficiently corrected using AutoCorrect rather than repeating the steps of the replacement test. Other embodiments may automatically add a corrected string pair including a first string which does not match a predetermined string and a second string which matches a predetermined string to an automatic replacement list which operates in a manner similar to the AutoCorrect List.

The automatic addition of a corrected word pair to the AutoCorrect List may be illustrated by the example given above using the word "konwledge". As discussed above, the misspelled word "konwledge" is replaced by the selected replacement word "knowledge". Once the misspelled word is replaced by the replacement word, the method proceeds to step 500 of FIG. 5. In step 500, a replacement notice may be displayed to the user to inform the user that the misspelled word was replaced by the replacement word. From step 500, the method proceeds to step 502. In step 502, a determination is made as to whether the replacement word is rejected in favor of the "misspelled" word. The rejection of the replacement word is discussed in more detail below. If the replacement word is accepted, then the method proceeds to step 504 In step 504, a corrected word pair including the misspelled word and the replacement word is added to the AutoCorrect List. In this example, a corrected word pair including the words "konwledge" and "knowledge" is added to the AutoCorrect List. If the user subsequently enters the word "konwledge", the word will be automatically corrected by AutoCorrect to "knowledge". The replacement test will not be performed.

A corrected word pair added to the AutoCorrect List as a result of the replacement test may or may not be distinguishable to the user from the corrected word pairs originally included in the AutoCorrect List or manually added by the user. Preferably, a user interface such as a drop down menu or a dialogue box provides the user with the option of disabling the automatic addition of a corrected word pair containing the misspelled word and the replacement word to the AutoCorrect List.

Editing the Exceptions List

In addition to the AutoCorrect List, the spelling embodiment also uses an Exceptions List containing exception words. Typically, an exception word is a user-defined word which is not subject to replacement by the replacement test. Examples of exception words may include technical or scientific words, trade names or trademarks, or slang words. A user may edit the Exceptions List to add or delete an exception word. Alternatively, an exception word may be automatically added to the Exceptions List. An exception word is automatically added to the Exceptions list whenever a user rejects a replacement word in favor of the original word.

Figure 5:
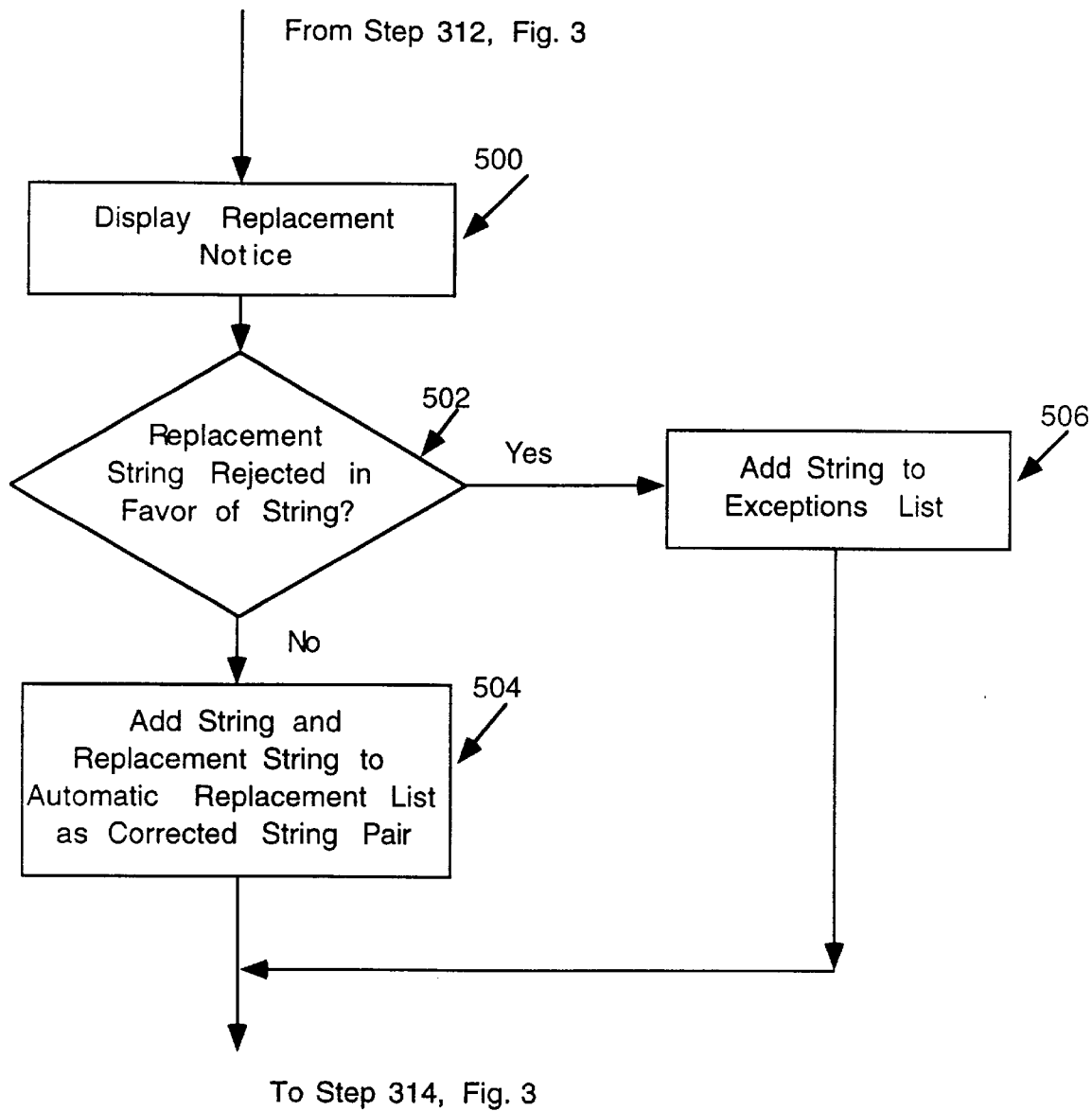
FIG. 5 is a logical flow diagram illustrating the steps for maintaining an automatic replacement list and an exceptions list in accordance with an exemplary embodiment of the present invention.

Automatically adding an exception word to the Exceptions list may be illustrated by an example using the word "theatre" and the flow diagrams of FIGS. 3–5. In this example, a user purposefully enters the word "theatre". The word "theatre" is received in step 302 of FIG. 3 and is detected as a misspelled word in step 304. The word "theatre" is compared to the exception words in the Exceptions List in step 306. In this example, the word "theatre" does not match an exception word so the method proceeds to step 308 and the replacement test is performed.

The steps of the first stage of the replacement test are illustrated in FIG. 4A. In step 416, the word "theatre" is compared to the replacement criteria. In this example, the word "theatre" satisfies the replacement criteria so the method proceeds to the second stage of the replacement test. The steps of the second stage of the replacement test are illustrated in FIG. 4B. In this example, the predetermined difference criteria include the Exactly One Adjacent Transpose difference criterion and the Initial Capital difference criterion. In step 400, the Exactly One Adjacent Transpose difference criterion is selected. The selected alternate word "theater" is received in step 402 and in step 404, the words "theatre" and "theater" are compared using the Exactly One Adjacent Transpose difference criterion.

In step 406, the determination is that the misspelled word "theatre" and the selected alternate word "theater" satisfy the Exactly One Adjacent Transpose difference criterion because transposing the "r" and the "e" in "theatre" produces "theater". Thus, the YES branch of step 406 is followed to step 408. In step 408, the word "theater" is identified as a replacement candidate word. Because there is only one selected alternate word, the determination in step 410 is that the misspelled word has been compared to all the selected alternate words. In step 412, the replacement indicator for the Exactly One Adjacent Transpose difference criterion is set to indicate that one replacement candidate word was identified. Once the replacement indicator for the Exactly One Adjacent Transpose difference criterion is set, a determination is made as to whether all the difference criteria have been applied in step 414. Since the Initial Capital difference criterion has not been applied, the method returns to step 400 and the Initial Capital difference criterion is selected.

The selected alternate word "theater" is received in step 402 and the words "theatre" and "theater" are compared using the Initial Capital difference criterion in step 404. Capitalizing the first character of "theatre" does not produce "theater" so the determination in step 406 is that the misspelled word "theatre" and the selected alternate word "theater" do not satisfy the Initial Capital difference criteria so the method proceeds to step 410. Because there is only one selected alternate word, the determination in step 410 is that the misspelled word has been compared to all of the selected alternate words. The replacement indicator is set in step 412 to indicate that zero replacement candidate words were identified for the Initial Capital difference criterion. Both of the difference criteria have been applied so the YES branch of step 414 is followed to step 420 of FIG. 4C.

The third stage of the replacement test is illustrated in FIG. 4C. The replacement indicators and the replacement candidate word are compared in step 420. In this example, the replacement indicators and the replacement candidate word satisfy the selection criteria so the replacement candidate word "theater" is selected as a replacement word in step 424. Returning to FIG. 3, the word "theatre" is replaced with the word "theater" in step 312. From step 312, the method proceeds to step 500 of FIG. 5. In step 500, a replacement notice may be displayed to the user. The replacement notice is discussed in more detail below. The method proceeds from step 500 to step 502 where a determination is made as to whether the replacement word is rejected. In this example, the user intended to type "theatre" so the user rejects the replacement word "theater" in favor of the original word "theatre". The user may reject the replacement word by manually replacing the replacement word "theater" with the original word "theatre" or by using an "UNDO" command to automatically replace the word "theater" with the original word "theatre". The "UNDO" command may be provided as part of the replacement notice.

If the user rejects the replacement word in favor of the original word then the YES branch of step 502 is followed to step 506. In step 506, the original word "theatre" is added to the Exceptions List as an exception word. Once the word "theatre" is added to the Exceptions List any subsequent occurrences of "theatre" are not affected by the replacement test. As discussed above, if the user accepts the replacement word, then the method proceeds to step 504 and the misspelled word and the replacement word are added to the AutoCorrect List.

An exception word may also be automatically added to the Exceptions List in response to a user editing the AutoCorrect List. If a user deletes a corrected word pair from the AutoCorrect List, then AutoCorrect will not "correct" the misspelled word of the corrected word pair. However, deleting a corrected word pair from the AutoCorrect List does not automatically disable the replacement test. If the misspelled word of the corrected word pair deleted from the AutoCorrect List would be corrected by the replacement test then the misspelled word must also be added to the Exceptions List to disable the replacement test. If a user deletes a corrected word pair from the AutoCorrect List, the user certainly does not want the replacement test to "correct" the "misspelled" word.

The determination as to whether the replacement test would correct the misspelled word of the corrected word pair may be made when the corrected word pair is added to the AutoCorrect List or when the corrected word pair is deleted from the AutoCorrect List. If the determination as to whether the replacement test would correct the misspelled word of the corrected word pair is made when the corrected word pair is added to the AutoCorrect List, a replacement field may be included for each corrected word pair in the AutoCorrect List. The replacement field indicates whether the misspelled word of the corrected word pair would be corrected by the replacement test.

To set the replacement field, the replacement test is performed on the misspelled word of the corrected word pair when the corrected word pair is added to the AutoCorrect List. If the replacement test identifies a replacement word, then the replacement field is set to indicate that the misspelled word would be corrected by the replacement test. If the replacement test does not identify a replacement word, then the replacement field is set to indicate that the misspelled word would not be corrected by the replacement test. For a corrected word pair added when the AutoCorrect List was originally assembled, the replacement field may be set when the AutoCorrect List is created. For a corrected word pair manually added to the AutoCorrect List by the user, the replacement field may be set when the corrected word pair is added to the AutoCorrect List. For a corrected word pair automatically added by the replacement test, the replacement field may be automatically set without repeating the replacement test.

If a replacement field is included for each corrected word pair, then the replacement field is checked whenever a user deletes a corrected word pair from the AutoCorrect List. If the replacement field indicates that the misspelled word satisfies the replacement test, then the misspelled word is automatically added to the Exceptions List to prevent the replacement test from "correcting" the "misspelled" word. Alternatively, if a replacement field is not included, then the replacement test is performed each time the user deletes a corrected word pair from the AutoCorrect to determine whether the misspelled word is added to the Exceptions List.

The Exceptions List may also be automatically updated if an editing program which implements the replacement test of the present invention is used after an editing program which supports AutoCorrect and uses a common AutoCorrect List, but does not support the replacement test. A previous change field may be included for each corrected word pair in the AutoCorrect List to indicate whether a corrected word pair was added to or deleted from the AutoCorrect List in an editing program supporting only AutoCorrect. The previous change field is checked when the editing program implementing the replacement test is started to determine whether the Exceptions List must be updated. If a corrected word pair was previously added to the AutoCorrect List, then the misspelled word of the corrected word pair is compared to the Exceptions List. If the misspelled word of the corrected word pair matches an exception word, then the exception word is deleted. Conversely, if a corrected word pair was previously deleted from the AutoCorrect List, then the replacement field is checked. If the replacement field indicates that the misspelled word satisfies the replacement test, then the misspelled word of the corrected word pair is added to the Exceptions List.

A user may also edit the Exceptions List by adding a word to the Exceptions List. If a user adds an exception word to the Exceptions List, then the exception word must be compared to the corrected word pairs in the AutoCorrect List. If the exception word matches a misspelled word of a corrected word pair of the AutoCorrect List, then the corrected word pair is automatically deleted from the AutoCorrect List. Deleting the word from the AutoCorrect List insures that AutoCorrect will not mistakenly "correct" the word the user has defined as an exception word.

Figure 6:
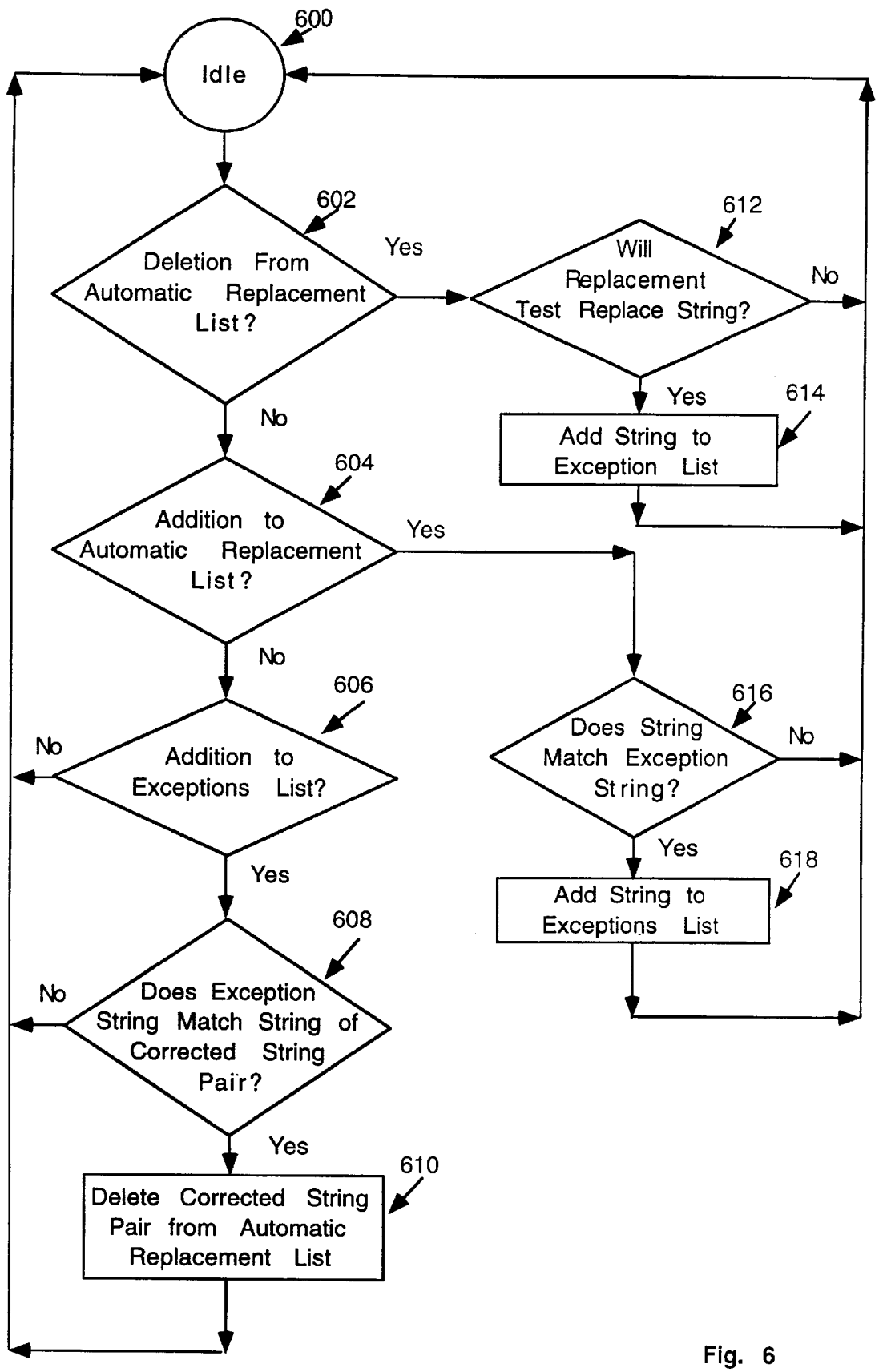
FIG. 6 is a logical flow diagram illustrating the steps for automatically adding a string to an exceptions list in accordance with an exemplary embodiment of the present invention.

Editing the Exceptions List may be illustrated by reference to the flow diagram of FIG. 6. In the spelling embodiment, the Automatic Replacement List of FIG. 6 is the AutoCorrect List. The method proceeds from the idle state of step 600 to step 602 whenever the AutoCorrect List or the Exceptions List is manually updated by a user or whenever an editing program which implements the replacement test is used after an editing program which implements only AutoCorrect using a common AutoCorrect List. In step 602, a determination is made as to whether a user deleted a corrected word pair from the AutoCorrect List. The user may have deleted a corrected word pair from the AutoCorrect List in the current editing program or in a previous editing program which implements only AutoCorrect but uses the same AutoCorrect list. If the user deleted the corrected word pair in a previous editing program, then step 602 may include checking the previous change field. If the user deleted a corrected word pair from the AutoCorrect List, then the method proceeds to step 612. In step 612, a determination is made as to whether the misspelled word of the corrected word pair would be corrected by the replacement test. The determination may be made by checking the replacement field or by performing the replacement test. If the misspelled word would be corrected by the replacement test, then the YES branch is followed from step 612 to step 614. In step 614, the misspelled word is added to the Exceptions List as an exception word. After the misspelled word is added to the Exceptions List, the method returns to step 600. If the determination in step 612 is that the misspelled word would not be corrected by the replacement test, then the NO branch is followed back to the idle state of step 600.

If the determination in step 602 is that the user did not delete a corrected word pair from the AutoCorrect List, then the method proceeds to step 604. In step 604, a determination is made as to whether the user added a corrected word pair to the AutoCorrect List. The user may have added a corrected word pair to the AutoCorrect List in the current editing program or in a previous editing program which implements only AutoCorrect. If the user added the corrected word pair in a previous editing program, then step 604 may include checking the previous change field. If the determination in step 604 is that a corrected word pair was added to the AutoCorrect List, then, in step 616, a determination is made as to whether the misspelled word matches an exception word in the Exceptions List. If the misspelled word matches an exceptions word in the Exceptions List, then the exception word is deleted from the Exceptions List in step 618. If the determination in step 616 is that the misspelled word does not match an exception word, then the method returns to step 600. If the determination in step 604 is that a corrected word pair was not added to the AutoCorrect List, then the method proceeds to step 606.

In step 606, a determination is made as to whether an exception word was added to the Exceptions List. If an exception word was added to the Exceptions List, then a determination is made in step 608 as to whether the exception word matches a misspelled word of a corrected word pair in the AutoCorrect List in step 608. If the exception word matches a misspelled word of a corrected word pair in the AutoCorrect List, then, in step 610, the corrected word pair containing the misspelled word is deleted from the AutoCorrect List. If the determination in step 606 is that an exception word was not added to the Exceptions List or the determination in step 608 is that the exception word does not match a misspelled word of a corrected word pair, then the method returns to the idle state of step 600.

Indicating the Correction to the User

In the spelling embodiment, the user may or may not receive notice when the replacement test replaces a misspelled word with a correctly spelled word. If the user receives a replacement notice then the user is aware of the replacement and may confirm or reject the replacement. However, because the replacement test generally replaces a misspelled word with the selected word the user intended to enter, the user may not want to be interrupted to receive a replacement notice. If a replacement notice is provided, the user may be able to completely or partially disable the notice.

If the spelling embodiment includes a replacement notice to the user, the replacement notice may be provided after the first replacement only, after a predetermined number of replacements or after every replacement. If the replacement notice is provided only after the first replacement, then preferably, the replacement notice includes information about the automatic correction of the misspelled word and the automatic addition of a corrected word pair containing the misspelled word and the correctly spelled replacement word to the AutoCorrect List. The information about the automatic correction may include instructions on how to disable automatic correction and how to undo an automatic correction.

If the replacement notice is provided after a predetermined number of replacements, then the replacement notice preferably identifies the misspelled words and the corresponding correctly spelled replacement words identified since the last notice. If the replacement notice is provided after every replacement, then the replacement notice may include visual ornamentation of the corrected word, animation highlighting the differences between the misspelled word and the correctly spelled replacement word, or an audible clue. Alternatively, the replacement notice may include revision marks showing the misspelled word replaced by the correctly spelled replacement word.

FIG. 5 illustrates providing a replacement notice to the user indicating that the replacement test automatically replaced a misspelled word with a correctly spelled replacement word. Once the misspelled word is replaced by the correctly spelled alternate word, the method proceeds to step 500. In step 500, the user receives a replacement notice indicating that the misspelled word was replaced by the correctly spelled word. If the replacement notice is provided after every correction, the replacement notice may include visual ornamentation of the corrected word, animation highlighting the differences between the misspelled word and the correctly spelled replacement word, or an audible clue. Although not shown in FIG. 5, if the replacement notice is only provided after the first correction or only after a predetermined number of corrections, then step 500 includes steps for determining when a replacement notice should be displayed.

In summary, the present invention is directed toward a method and system for automatically detecting a first string which does not match a predetermined string and replacing the first string with a second string which matches a predetermined string. The present invention may be used to automatically detect an invalid string and to replace the invalid string with a valid string. In the spelling embodiment, the invention may be used to automatically detect a misspelled word and replace the misspelled word with a correctly spelled word. Once a word is detected as a misspelled word, a correctly spelled alternate word is identified. The misspelled word and the correctly spelled alternate word are compared using a set of rules or difference criteria. The difference criteria correspond to common types of misspellings. If the misspelled word and a correctly spelled alternate word differ according to a difference criterion, then the correctly spelled alternate word is identified as a replacement candidate word. The results of the difference criteria comparisons are reviewed using a set of selection criteria. If the results of the difference criteria comparisons satisfy the selection criteria then one of the replacement candidate words is selected as a replacement word and the misspelled word is replaced by the replacement word. Although the present invention has been described in connection with detecting and correcting misspelled words, those skilled in the art will recognize that the present invention may be used to detect and correct any invalid string.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for detecting a first string which does not match one of a plurality of predetermined strings and replacing the first string with a second string which matches one of the plurality of predetermined strings comprising:

receiving a string;

determining whether the string matches one of the plurality of predetermined strings; and if the string does not match one of the plurality of predetermined strings, then A. determining that the string is the first string;

B. receiving an alternate string which matches one of the plurality of predetermined strings;

C. comparing the first string and the alternate string using a plurality of difference criteria;

D. for each of the difference criteria, if the first string and the alternate string differ according to the difference criterion, then
      (i) identifying the alternate string as a replacement candidate string for the difference criterion, and
      (ii) setting one of a plurality of replacement indicators indicating that the replacement candidate string exists for the difference criterion;

E. if the replacement indicators from the difference criteria satisfy a selection criterion, then selecting one of the replacement candidate strings identified by the difference criterion as the second string; and F. replacing the first string with the second string.

2. The method of claim 1, wherein the step of determining whether the string matches one of the plurality of predetermined strings comprises:

comparing the string to an exceptions list comprising a plurality of exception strings; and if the string matches one of the exception strings in the exceptions list, then determining that the string matches one of the plurality of predetermined strings.

3. The method of claim 1, wherein the replacement indicators satisfy the selection criterion if the replacement indicators indicate that the first string and the alternate string differ according to only one of the difference criteria.

4. The method of claim 1, further comprising:

receiving a second alternate string;

comparing the first string and the second alternate string using the plurality of difference criteria; and for each of the difference criteria, if the first string and the second alternate string differ according to the difference criterion, then
      (i) identifying the second alternate string as a replacement candidate string for the difference criterion, and
      (ii) setting one of a plurality of replacement indicators indicating that the replacement candidate string exists for the difference criterion.

5. The method of claim 1, further comprising:

maintaining a correction list comprising a plurality of corrected string pairs by adding the first string and the second string to the correction list as a corrected string pair if the first string is replaced by the second string.

6. The method of claim 1, wherein a correction list comprises a corrected string pair comprising an uncorrected string and a corrected string, and wherein if the corrected string pair is deleted from the correction list then checking whether the uncorrected string would be replaced by a string matching one of a plurality of predetermined strings; and if the uncorrected string would be replaced by a string matching one of a plurality of predetermined strings, then adding the uncorrected string to an exceptions list as an exception string.

7. The method of claim 1, further comprising:

maintaining an exceptions list comprising a plurality of exception strings by adding the first string to the exceptions list as an exception string if the first string is replaced by the second string but the second string is rejected in favor of the first string.

8. The method of claim 1, further comprising:

if the first string is replaced by the second string, then providing a replacement notice indicating that the first string was replaced by the second string.

9. A computer-readable medium having computer executable instructions comprising:

a string checker program module for determining whether a string is an invalid string, and if the string is an invalid string, for providing an alternate string;

a plurality of comparator program modules for comparing the invalid string and the alternate string, each comparator program module corresponding to a difference criterion; and an arbitrator program module for arbitrating between the comparator program modules and for replacing the invalid string with a replacement string.

10. The computer-readable medium of claim 9 having further computer-executable instructions comprising:

an exceptions list comprising an exception string, wherein if the exception string matches the string, then the exception string overrides a determination by the string checker program module that the string is an invalid string.

11. The computer-readable medium of claim 10, wherein:

if the invalid string is replaced by the replacement string but the replacement string is rejected in favor of the invalid string, then the invalid string is added to the exceptions list as an exception string.

12. The computer-readable medium of claim 9, having further computer-executable instructions comprising:

an enabler program module for determining whether the invalid string satisfies a replacement criterion.

13. The computer-readable medium of claim 12, wherein if the invalid string does not satisfy the replacement criterion then the invalid string is not replaced.

14. The computer-readable medium of claim 9, wherein if the invalid string and the alternate string differ according to one of the difference criteria, then the corresponding comparator program module outputs the alternate string as a replacement candidate string.

15. The computer-readable medium of claim 14, wherein the corresponding comparator program module outputs a replacement indicator to indicate that the replacement candidate string was identified.

16. The computer-readable medium of claim 15, wherein the arbitrator program module has further computer-executable instructions comprising:

receiving a replacement indicator from each of the comparator program modules;

if the replacement indicators satisfy a selection criterion then selecting one of the replacement candidate strings as the replacement string.

17. The computer-readable medium of claim 9, having further computer executable instructions comprising:

a corrections list comprising a plurality of corrected string pairs, wherein if the invalid string is replaced by the replacement string then adding the invalid string and the replacement string to the corrections list as a corrected string pair.

18. The computer-readable medium of claim 9, having further computer executable instructions comprising:

a replacement notifier program module for providing a replacement notice to a user whenever an invalid string is replaced by a replacement string.

19. A computer-readable medium having computer executable instructions for automatically detecting and correcting a spelling error using a plurality of difference criteria comprising the steps of:

receiving a word;

determining whether the word is misspelled;

if the word is misspelled, then receiving a plurality of selected alternate words;

for each of the difference criteria, repeating the steps of:
  (i) comparing the word and the selected alternate words;
  (ii) for each selected alternate word, if the word and the selected alternate word differ according to the difference criterion then
    (a) identifying the selected alternate word as a replacement candidate word for the difference criterion; and
    (b) setting one of a plurality of replacement indicators indicating that the difference criterion has identified the replacement candidate word;

if the replacement indicators satisfy a set of selection criteria then selecting one of the replacement candidate words as a replacement word; and replacing the word with the replacement word.

20. The computer-readable medium of claim 19 wherein the replacement indicators satisfy the set of selection criteria if the replacement indicators indicate that exactly one of the difference criteria identified exactly one replacement candidate word.

21. The computer-readable medium of claim 19 wherein the step of determining whether the word is misspelled comprises:

comparing the word to an exceptions list comprising an exception word; and if the word matches the exception word, then not replacing the word.

22. The computer-readable medium of claim 19, further comprising:

maintaining a correction list comprising a plurality of corrected word pairs by adding the word and the replacement word to the correction list as a corrected word pair if the word is replaced by the replacement word.

23. The computer-readable medium of claim 19, further comprising:

maintaining an exceptions list by adding the word to the exceptions list as an exception word if the word is replaced by the replacement word but the replacement word is subsequently replaced by the word.

24. The computer-readable medium of claim 19, further comprising:

if the word is replaced by the replacement word then providing a replacement notice indicating that the word was replaced by the replacement word.

25. The computer-readable medium of claim 19, further comprising:

comparing the word to a replacement criterion; and if the word does not satisfy the replacement criterion then not replacing the word.

26. The computer-readable medium of claim 19, wherein one of the difference criteria determines whether transposing two adjacent characters in the word produces one of the selected alternate words.

27. The computer-readable medium of claim 19, wherein one of the difference criteria determines whether capitalizing the first character of the word produces one of the selected alternate words.

28. The computer-readable medium of claim 19, wherein one of the difference criteria determines whether inserting a character into the word produces one of the selected alternate words.

29. The computer-readable medium of claim 19, wherein one of the difference criteria determines whether deleting a character from the word produces one of the selected alternate words.

30. The computer-readable medium of claim 19, wherein one of the difference criteria determines whether adding a diacritic to the word produces one of the selected alternate words.

31. The computer-readable medium of claim 19, wherein the selected alternate words are selected from a plurality of correctly spelled alternate words using a correction probability.

32. The computer-readable medium of claim 19, wherein a first character is adjacent to a second character on a keyboard, and wherein one of the difference criteria determines whether replacing the first character in the word with the second character produces one of the selected alternate words.

33. The computer-readable medium of claim 19, wherein a first character is entered using a combination of a first key and a control key and a second character is entered using the first key, and wherein one of the difference criteria determines whether replacing the first character in the word with the second character produces one of the selected alternate words.

34. The computer-readable medium of claim 19, wherein a first character is adjacent to a second character on a keyboard and in the word, and wherein one of the difference criteria determines whether deleting the second character from the word produces one of the selected alternate words.

* * * * *